(12) United States Patent
Wang et al.

(10) Patent No.: US 11,905,442 B2
(45) Date of Patent: Feb. 20, 2024

(54) SCREEN SPLICING STRUCTURE AND METHOD FOR FORMING SCREEN SPLICING STRUCTURE

(71) Applicant: APPOTRONICS CORPORATION LIMITED, Guangdong (CN)

(72) Inventors: Jie Wang, Guangdong (CN); Lin Wang, Guangdong (CN); Hongxiu Zhang, Guangdong (CN); Fei Hu, Guangdong (CN); Yi Li, Guangdong (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 261 days.

(21) Appl. No.: 17/299,758

(22) PCT Filed: Nov. 18, 2019

(86) PCT No.: PCT/CN2019/119156
§ 371 (c)(1),
(2) Date: Jun. 3, 2021

(87) PCT Pub. No.: WO2020/114227
PCT Pub. Date: Jun. 11, 2020

(65) Prior Publication Data
US 2022/0017786 A1   Jan. 20, 2022

(30) Foreign Application Priority Data

Dec. 6, 2018   (CN) .......................... 201811492400.3

(51) Int. Cl.
*C09J 7/25* (2018.01)
*C09J 7/24* (2018.01)
(Continued)

(52) U.S. Cl.
CPC ............... *C09J 7/255* (2018.01); *C09J 5/00* (2013.01); *C09J 7/243* (2018.01); *C09J 7/245* (2018.01);
(Continued)

(58) Field of Classification Search
CPC ...... G03B 21/60; G03B 21/602; G03B 21/56; G03B 21/625; G03B 21/604
(Continued)

(56) References Cited

U.S. PATENT DOCUMENTS 5,525,272 A * 6/1996 Dugdale ................. B29C 51/14
264/129
9,823,561 B2 * 11/2017 Sharp ...................... G03B 21/56
(Continued)

FOREIGN PATENT DOCUMENTS

CN     201374154 Y * 12/2009   ........... G06F 3/1446
CN     201876660 U * 6/2011
(Continued)

OTHER PUBLICATIONS

Qing, L., "Introduction to Glass Technology for Flat Panel Display Substrates," Hebei Science and Technology Press, Shijiazhuang City, Hebei Province, Jun. 2017, 4 pages. (Submitted with Machine Translation).
(Continued)

*Primary Examiner* — Stephanie E Bloss
*Assistant Examiner* — Kevin C Butler
(74) *Attorney, Agent, or Firm* — McCoy Russell LLP

(57) ABSTRACT

A screen splicing structure is provided. The screen splicing structure includes a substrate layer, a middle adhesive layer, and a surface layer. The substrate layer includes a first substrate and a second substrate. The second substrate is spliced with the first substrate, and a seam is formed at a splicing place. The surface layer and the middle adhesive
(Continued)

layer are stacked. The surface layer covers the seam by bonding the middle adhesive layer and the substrate layer. The peeling strength of the surface layer and the substrate layer is greater than or equal to 1,000 gf/inch. A method for forming the screen splicing structure is also provided.

17 Claims, 5 Drawing Sheets

(51) Int. Cl.
*C09J 5/00* (2006.01)
*G03B 21/56* (2006.01)

(52) U.S. Cl.
CPC ......... *G03B 21/56* (2013.01); *C09J 2301/312* (2020.08); *C09J 2423/046* (2013.01); *C09J 2423/106* (2013.01); *C09J 2427/006* (2013.01); *C09J 2467/006* (2013.01)

(58) Field of Classification Search
USPC ........................................................ 359/455
See application file for complete search history.

(56) References Cited

U.S. PATENT DOCUMENTS

| | | | | |
|---|---|---|---|---|
| 2006/0098280 | A1* | 5/2006 | Yamauchi | G03B 21/60 359/454 |
| 2022/0017786 | A1* | 1/2022 | Wang | G09F 9/33 |
| 2022/0229330 | A1* | 7/2022 | Kim | B32B 7/023 |

FOREIGN PATENT DOCUMENTS

| | | | | | |
|---|---|---|---|---|---|
| CN | 2018176660 | U | | 6/2011 | |
| CN | 102207567 | A | * | 10/2011 | |
| CN | 102207567 | A | | 10/2011 | |
| CN | 103440830 | A | * | 12/2013 | ........... G09F 9/3026 |
| CN | 103440830 | A | | 12/2013 | |
| CN | 203324639 | U | | 12/2013 | |
| CN | 203324639 | U | * | 12/2013 | |
| CN | 103782233 | A | * | 5/2014 | ............. G03B 21/56 |
| CN | 104851373 | A | | 8/2015 | |
| CN | 104851373 | A | * | 8/2015 | ............... G09F 9/33 |
| CN | 107807489 | A | * | 3/2018 | |
| CN | 107807489 | A | | 3/2018 | |
| CN | 108230913 | A | | 6/2018 | |
| CN | 108230913 | A | * | 6/2018 | ........... G09F 9/3026 |
| CN | 108346381 | A | | 7/2018 | |
| CN | 108346381 | A | * | 7/2018 | ............... G09F 9/33 |
| CN | 108388074 | A | * | 8/2018 | ............. G03B 21/54 |
| CN | 108388074 | A | | 8/2018 | |
| CN | 108461528 | A | * | 8/2018 | ........... H01L 25/048 |
| CN | 108461528 | A | | 8/2018 | |
| CN | 111768716 | A | * | 10/2020 | ............. G09F 9/302 |
| CN | 112578626 | A | * | 3/2021 | ............. G02B 30/25 |
| CN | 113112925 | A | * | 7/2021 | ............. G09F 9/302 |
| CN | 214067571 | U | * | 8/2021 | |
| CN | 114035401 | A | * | 2/2022 | |
| JP | 2007094069 | A | | 4/2007 | |
| JP | 2007094069 | A | * | 4/2007 | |
| WO | 2010105395 | A1 | | 9/2010 | |
| WO | WO-2015027580 | A1 | * | 3/2015 | ........... G09F 9/3026 |
| WO | WO-2022148017 | A1 | * | 7/2022 | |

OTHER PUBLICATIONS

State Intellectual Property Office of the People's Republic of China, Office Action and Search Report Issued in Application No. 201811492400.3, dated Jan. 11, 2022, 14 pages. (Submitted with Partial Translation).

ISA China National Intellectual Property Administration, International Search Report Issued in Application No. PCT/CN2019/119156, dated Feb. 21, 2020, WIPO, 5 pages.

State Intellectual Property Office of the People's Republic of China, Office Action and Search Report Issued in Application No. 201811492400.3, dated Apr. 16, 2021, 12 pages. (Submitted with Machine Translation).

* cited by examiner

SCREEN SPLICING STRUCTURE AND METHOD FOR FORMING SCREEN SPLICING STRUCTURE

CROSS REFERENCE TO RELATED APPLICATIONS

The present application is a U.S. National Phase of International Application No. PCT/CN2019/119156 entitled "SCREEN SPLICING STRUCTURE AND FORMATION METHOD THEREFOR," and filed on Nov. 18, 2019. International Application No. PCT/CN2019/119156 claims priority to Chinese Patent Application No. 201811492400.3 filed on Dec. 6, 2018. The entire contents of each of the above-listed applications are hereby incorporated by reference for all purposes.

TECHNICAL FIELD

The present disclosure relates to the field of projection screens, in particular to a screen splicing structure and a method for forming the screen splicing structure.

BACKGROUND AND SUMMARY

With the current development of the movie industry, the demand for high-quality movie screens is also increased. Compared with screens with low modulus of elasticity, screens with high modulus of elasticity have good elastic properties and can eliminate speckles by conventional vibration methods, so that the screens with high modulus of elasticity are widely used in the polarization-maintaining screens with high gain and high reflection. However, the current process is restricted by the radiance width of the equipment, and the screens can only be made by coating and then processing. Specifically, the screen splicing operation is required. For the screens using materials with high modulus of elasticity, they have good elastic performance, and the normal at the splicing seam after splicing is prone to be changed. The normal refers to a reference line perpendicular to any plane on the screen. Normally when the screen is in a flat state, the normals everywhere on the screen are consistent, and images reflected by the screen are uniform; when the screen bears forces uniformly, the screen will be deformed at a certain position, the normal direction at that position will change, and the images will be distorted. Since the reflective coating on the screen with high modulus of elasticity has been well coated before splicing, the change of the normal will cause the reflection angle of the projected light being different from those at other flat points, which visually presents a black line perception of the splicing seam. Therefore, there is a need to provide a splicing structure for screens with high modulus of elasticity.

The present disclosure provides a screen splicing structure and a method for forming the screen splicing structure, which can effectively reduce the variation of the normal at the splicing seam.

The embodiments of the present disclosure achieve the above objectives through the following technical solutions.

In a first aspect, the present disclosure provides a screen splicing structure, and the screen splicing structure includes a substrate layer, an intermediate adhesive layer, and a surface layer. The substrate layer includes a first substrate and a second substrate. The second substrate and the first substrate are spliced and form a splicing seam at a splicing joint. The surface layer and the intermediate adhesive layer are stacked, and the surface layer is bonded to the substrate layer through the intermediate adhesive layer. The surface layer covers the splicing seam. A peeling strength between the surface layer and the substrate layer is greater than or equal to 1000 gf/inch.

In a second aspect, the present disclosure also provides a method for forming the screen splicing structure, and the method including following steps:
(1) selecting one side edge of the first substrate and one side edge of the second substrate, and forming the splicing seam by arranging the side edge of the first substrate and the side edge of the second substrate to be close to each other;
(2) removing an optical functional material layer within a preset width range from the side edge of the first substrate and the side edge of the second substrate to form the optical functional material default zone;
(3) providing a composite tape, the composite tape including a second optical functional material layer, a surface layer, an intermediate adhesive layer, and a release layer that are stacked; and
(4) removing the release layer, attaching remaining parts of the composite tape to the splicing seam, flattening air bubbles or wrinkles between the intermediate adhesive layer and the substrate layer using a roller after covering is completed, and curing the intermediate adhesive layer.

In a third aspect, the present disclosure also provides a method for forming the screen splicing structure, and the method includes following steps:
(1) selecting one side edge of the first substrate and one side edge of the second substrate, and forming the splicing seam by arranging the side edge of the first substrate and the side edge of the second substrate to be close to each other;
(2) uniformly coating the back surface or the surface layer with a glue to form the intermediate adhesive layer, the glue being one of a Light-curable adhesive, a thermosetting adhesive and a pressure-sensitive adhesive; and
(3) covering the intermediate adhesive layer with the surface layer, flattening air bubbles or wrinkles between the surface layer and the intermediate adhesive layer using a roller after the covering is completed, and curing the intermediate adhesive layer.

In a fourth aspect, the present disclosure also relates to a method for forming the above-mentioned screen splicing structure, including the following steps:
(1) selecting one side edge of the first substrate and one side edge of the second substrate, and forming the splicing seam by arranging the side edge of the first substrate and the side edge of the second substrate to be close to each other;
(2) providing the connecting layer and uniformly coating the connecting layer with a glue to form the intermediate adhesive layer, the glue being one of a light-curable adhesive, a thermosetting adhesive and a pressure-sensitive adhesive;
(3) covering the back surface of the substrate layer with the intermediate adhesive layer located on the connecting layer, and flattening air bubbles or wrinkles between the intermediate adhesive layer and the substrate layer using a roller after the covering is completed;
(4) curing the intermediate adhesive layer and uniformly coating the surface layer with a glue to form the connecting adhesive layer, the glue being one of a Light-curable adhesive, a thermosetting adhesive and a pressure-sensitive adhesive; and (5) covering the connecting layer with the surface layer, flattening air bubbles or wrinkles between the connecting adhesive layer and the connecting layer after the covering is completed, and curing the connecting adhesive layer.

The screen splicing structure provided by the present disclosure can effectively reduce the variation of the normal at the splicing seam by gluing the intermediate adhesive layer and the substrate layer and covering the surface layer with the intermediate adhesive layer and the splicing seam. The method for forming the screen splicing structure provided by the present disclosure has a simple process, and minimizes the variation of the local normal at the splicing seam by setting the coating sequence of different adhesive layers, chemical treatment on the surface of the adhesive layers, and flattening the air bubbles or wrinkles between different spliced layers so as to ensure the flatness of the glue layer and the bonding force between the adhesive layers.

These or other aspects of the present disclosure will be more concise and understandable in the description of the following embodiments.

BRIEF DESCRIPTION OF THE FIGURES

In order to explain the technical solutions in the embodiments of the present disclosure more clearly, the drawings used in the description of the embodiments will be simply introduced below. Apparently, the drawings in the following description are only some embodiments of the present disclosure. Those skilled in the art can also obtain other drawings based on these drawings without creative efforts.

DETAILED DESCRIPTION

Figure 1:
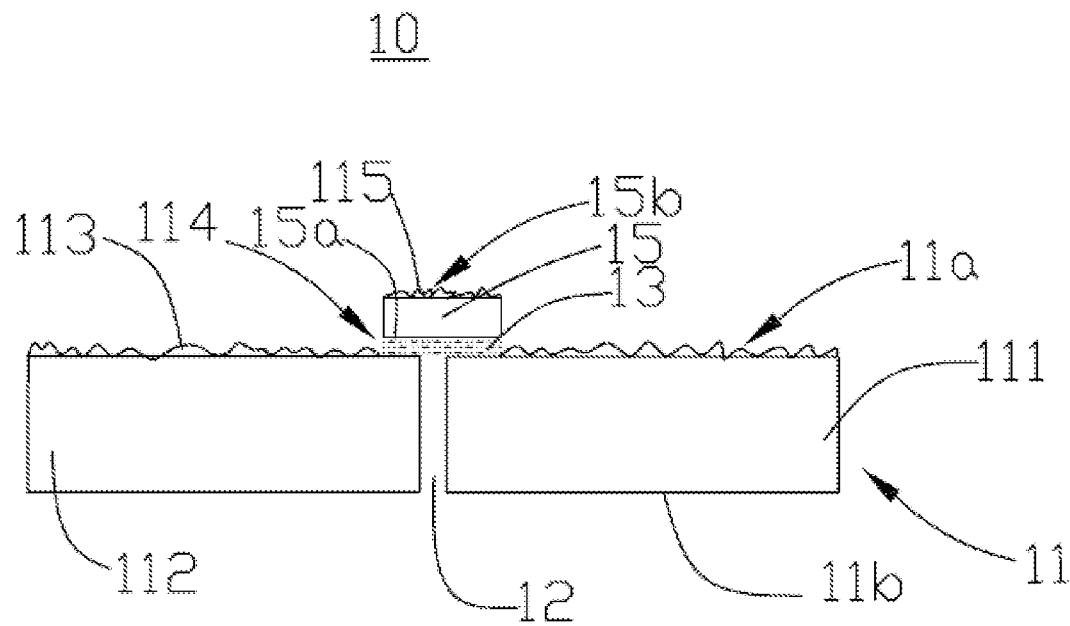
FIG. 1 is a schematic diagram of a screen splicing structure provided by an embodiment of the present disclosure.

In order to enable those skilled in the art to better understand the solutions of the present disclosure, the technical solutions in the embodiments of the present disclosure will be described clearly and completely in conjunction with the accompanying drawings in the embodiments of the present disclosure. Apparently, the described embodiments are only a part of the embodiments of the present disclosure, rather than all the embodiments. Based on the embodiments of the present disclosure, all other embodiments obtained by those skilled in the art without creative efforts shall fall within the protection scope of the present disclosure.

The present disclosure provides a screen splicing structure including a substrate layer, an intermediate adhesive layer and a surface layer, the substrate layer includes a first substrate and a second substrate, a side of the first substrate and a side of the second substrate are spliced and form a splicing seam at a splicing joint, and the surface layer is bonded to the substrate layer through the intermediate adhesive layer. Specifically, the surface layer is bonded to the first substrate and the second substrate through the intermediate adhesive layer, and the surface layer covers the splicing seam.

The substrate layer is one of polyethylene terephthalate, polypropylene, polyethylene, and polyvinyl chloride. The above-mentioned materials have a modulus of elasticity greater than 2.5 Gpa and belong to materials with a high modulus of elasticity. Compared with materials with a low modulus of elasticity, they have a smaller amount of deformation under the same screen vibration, which improves the viewing effect. The substrate layer includes a front surface configured to receive projection images and a back surface opposed to the front surface. Since the screen made of a material having a high modulus of elasticity is easily deformed at the incision during cutting, defects such as changes of the normal and overflowing of the glue during splicing occur. The inventor found through experimental research that, with the splicing structure of the present disclosure, the substrate layer having a modulus of elasticity greater than 2.5 Gpa can also reach a higher reliability, and the changes of the normal is small.

The surface layer can be bonded to the front surface of the substrate layer through the intermediate adhesive layer, i.e., front splicing, or bonded to the back surface of the substrate layer through the intermediate adhesive layer, i.e., back splicing. A peeling strength between the surface layer and the substrate layer is greater than 1000 gf/inch to ensure a minimal change of the normal of the screen surface. The peeling strength can be measured by a peeling strength tester. The surface layer is a transparent material, which is suitable for light-curable adhesives. The surface layer and the substrate layer can made of the same material to ensure the same shrinkage rate under the influence of the environment.

The intermediate adhesive layer is formed by curing a glue. The glue can be any one of a light-curable adhesive, a thermosetting adhesive and a pressure-sensitive adhesive, such as Dymax3094-Gel-F, which has a linear shrinkage of 0.4% and can be quickly cured under light.

The intermediate adhesive layer covers at least a part of the side of the substrate layer to be spliced, so that the surface layer is bonded to the substrate layer through the intermediate adhesive layer, thereby achieving the purpose of splicing. The intermediate adhesive layer can also cover the splicing seam. It should be understood that the intermediate adhesive layer can also be cut off at the splicing seam, that is, the intermediate adhesive layer only covers a surface area of the side of the substrate layer to be spliced, and whether the intermediate adhesive layer needs to cover the splicing seam can be selected according to the reliability of the splicing structure. For example, when the front splicing of the substrate layer is adopted, since the surface layer covers the splicing seam, the intermediate adhesive layer can cover the splicing seam. It is because that part of the glue will penetrate into the splicing seam through the capillary effect which causes the formed intermediate adhesive layer directly bonding the first substrate to the second substrate to improve the reliability of the splicing structure. When the back splicing of the substrate layer is adopted, in order to prevent the glue from penetrating from the splicing seam to the front surface of the substrate layer and affecting the viewing images, the scheme that the intermediate adhesive layer is cut off at the splicing seam can be adopted. Or a glue with a viscosity of 1 wcps to 10 wcps is adopted, and the glue having this viscosity range has a very low capillary effect, which can prevent too much glue from penetrating to the front surface through the splicing seam. When the glue with low capillary effect is used, the scheme of the intermediate adhesive layer covering the splicing seam is also acceptable.

It should be noted that due to that a high-strength cutting stress of the cutter during the cutting of the substrate will cause deformation of the substrate at the position into which the cutter cuts, that is, protrusions will be formed on the edge of the substrate cut by the cutter along the cutting path. Therefore, when the back splicing is adopted, it is necessary to avoid the instability of the splicing structure due to the protrusions, which causes the distortion of the projection images due to change of the normal at the splicing joint.

In the present disclosure, the thickness of the intermediate adhesive layer can be increased in such a manner that the thickness of the intermediate adhesive layer is greater than the height of the protrusions on the edge, and the protrusions can be evaded when covering the surface layer, thereby achieving the flatness of the surface layer. Further, a connecting layer can be added. The connecting layer is located between the substrate layer and the surface layer, and is bonded to the surface layer and the substrate layer through a connecting adhesive layer and the intermediate adhesive layer, respectively. A sum of a thickness of the connecting layer and a thickness of the intermediate adhesive layer is greater than a height of the protrusion on the edge, which can evade the protrusions when covering with the surface layer. The inventor found through experiments that the connecting layer can further improve the stability of the screen splicing structure. This is because when the screen is stretched, the connecting layer receives forces from the substrate layer and the surface layer at the same time, and the forces act in opposite directions to play a buffering effect to a certain extent. The connecting layer can be made of the same material as the substrate layer or the surface layer.

A thickness of the substrate layer is usually within a range of 100 μm to 250 μm. In order to ensure the reliability of the splicing structure, a thickness of the surface layer is within a range of 100 μm to 250 μm, and a thickness of the spliced layer is within a range of 50 μm to 250 μm. For the front splicing, when the thickness of the surface layer is greater than 100 μm, viewers at both sides of the screen will observe obvious picture dividing lines at the edges of the surface layer, which can be solved by spray coating the edge of the surface layer with the same optical functional material as the screen surface. Alternatively, the thickness of the surface layer is reduced. The inventors found through experiments that when the surface layer material is made of polyethylene terephthalate with a thickness of 5 μm to 10 μm, the perception of picture division caused by the edge of the surface layer can be eliminated, and the splicing structure has a good reliability.

It should be noted that the above-mentioned optical functional material includes, but is not limited to, one or more of metal, glass, or resin. Specifically, the metal is, for example, aluminum powder, silver powder, or aluminum-silver powder, and the glass is, for example, glass powder or glass beads. The formed optical functional material layer can be a uniform coating layer formed by the above-mentioned optical functional material, or can be a layer with a special microstructure, such as a zigzag structure layer that can directionally reflect projected light. In order to ensure versatility, the optical functional material can be essentially any one or more of materials disclosed in the prior art in the field of projection screens that can improve the reflection of the projection images.

In a possible embodiment, referring to FIG. 1, the present disclosure provides a screen splicing structure 10, which includes a substrate layer 11, an intermediate adhesive layer 13 and a surface layer 15. The substrate layer 11 includes a first substrate 111 and a second substrate 112, and a splicing seam 12 is formed between the second substrate 112 and the first substrate 111. The intermediate adhesive layer 13 and the surface layer 15 are stacked, and the surface layer 15 covers the splicing seam 12.

The substrate layer 11 includes a front surface 11a and a back surface 11b that face away from each other. The front surface 11a is provided with a first optical functional material layer 113 and an optical functional material default zone 114. The front surface 11a can be used as the front surface of the screen, that is, a viewing surface. The optical functional material default zone 114 is arranged along the splicing seam 12. The intermediate adhesive layer 13 and the surface layer 15 are arranged in the optical functional material default zone 114 on the front surface 11a for splicing. Compared with the case of splicing on the back surface 11b, in the splicing process of the front splicing, the splicing situation of the first optical functional material layer 113 on the front surface 11a of the first substrate 111 and the second substrate 112 can be directly observed, which greatly reduces the difficulty in alignment of the splicing seam 12. Further, the front splicing can block the splicing seam, avoiding the distortion of the projection images due to the change of the normal at the splicing seams during use, which will degenerate the viewing experience.

The surface layer 15 includes a bonding surface 15a and an outer surface 15b that face away from each other. The bonding surface 15a is bonded with the intermediate adhesive layer 13, and the outer surface 15b is provided with a second optical functional material layer 115. The outer surface 15b of the surface layer 15 is provided with the second optical functional material layer 115 with an optical effect, which ensures that the color at the splicing seam 12 is consist to the color of the display screen and thus greatly improves the viewing visual effect of the pictures. The substrate layer 11 and the surface layer 15 are effectively bonded through the intermediate adhesive layer 13, and the surface layer smoothly covers the splicing seam 12, so as to achieve the purpose of screen splicing and meet the needs of large-screen movie viewing. In the above-mentioned splicing structure 10, the substrate layer 11 is made of polypropylene, the surface layer 15 is made of polypropylene, the intermediate adhesive layer is made of a thermosetting adhesive, and the first optical functional material layer 113 and the second optical functional material layer 116 are aluminum-silver powder coating layers. The aluminum-silver powder coating layers can be formed by a coating process, or by a magnetron sputtering process. The thickness of the substrate layer 11 is 100 μm, the thickness of the intermediate adhesive layer 13 is 2μm, and the thickness of the surface layer 15 is 5 μm. A sum of the thickness of the intermediate adhesive layer 13 and the thickness of the surface layer 15 is much smaller than the thickness of the substrate layer 11, and the splicing structure 10 will not substantially affect the visual presentation effect of the entire screen.

In other embodiments, the substrate layer 11 and the surface layer 15 can also be made of any one of polyethylene terephthalate, polyvinyl chloride, and polyethylene, and the intermediate adhesive layer 13 can also be a light-curable adhesive, or pressure-sensitive adhesive. The thickness of the substrate layer 11 can be any value within a range from 100 μm to 250 μm, the thickness of the intermediate adhesive layer 13 can be any value within a range from 2 μm to 3 μm, and the thickness of the surface layer 15 can be any value within a range from 5 μm to 10 μm.

Figure 2:
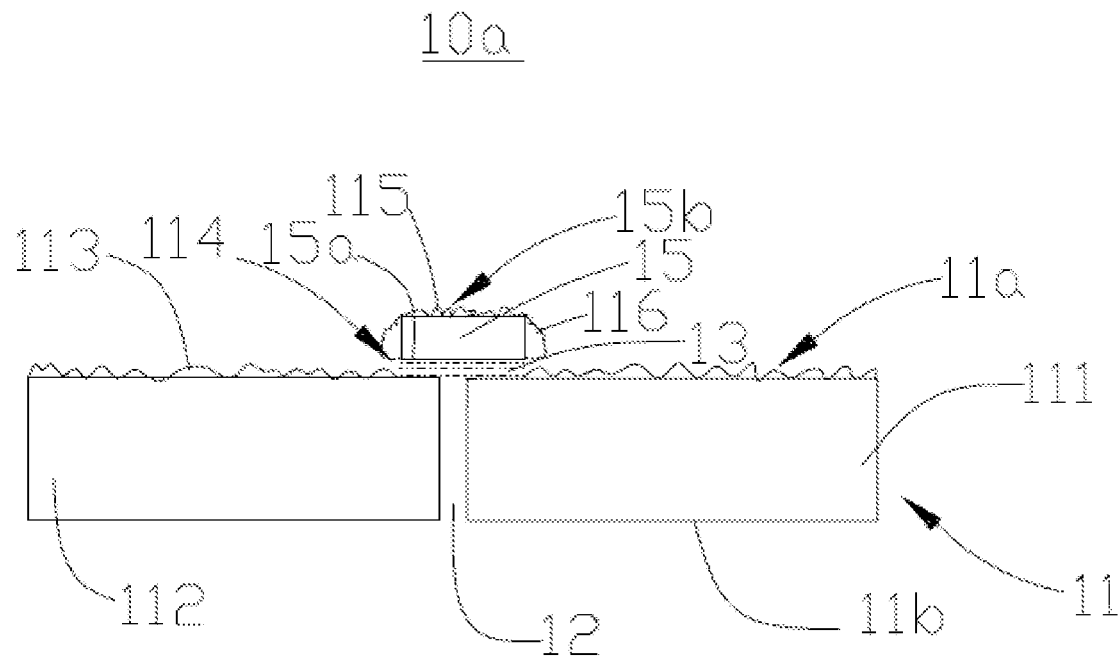
FIG. 2 is another schematic diagram of a screen splicing structure provided by an embodiment of the present disclosure.

The front splicing of the surface layer 15 can block the splicing seam 12, however, since the surface layer 15 has a certain thickness, this thickness will cause the picture to present an obvious dividing line at the edge of the surface layer 15, and the dividing line becomes more obvious with the increase of the viewing angle. In an embodiment, referring to FIG. 2, the screen splicing structure 10a further includes a third optical functional material layer 116 on a side surface of the surface layer 15, and the third optical functional material layer 116 has a width decreasing from the bonding surface 15a to the outer surface 15b to form an inclined plane connecting the second optical functional material layer 115 on the surface layer 15 with the first optical functional material layer 113 on the substrate layer 11. The provided inclined plane can eliminate the above-mentioned picture dividing line.

In an embodiment, the intermediate adhesive layer 13 includes a part located within the splicing seam 12 in addition to a part located in the default zone 114. A part of the glue forming the intermediate adhesive layer 13 permeates into the splicing seam 12 through the capillary effect, and plays a role of directly bonding the first substrate 111 and the second substrate 112, which can reduce the deformation stress generated when bonding the first substrate 111 and the second substrate 112 respectively by the surface layer 15, and improve the reliability of the splicing structure.

Figure 3:
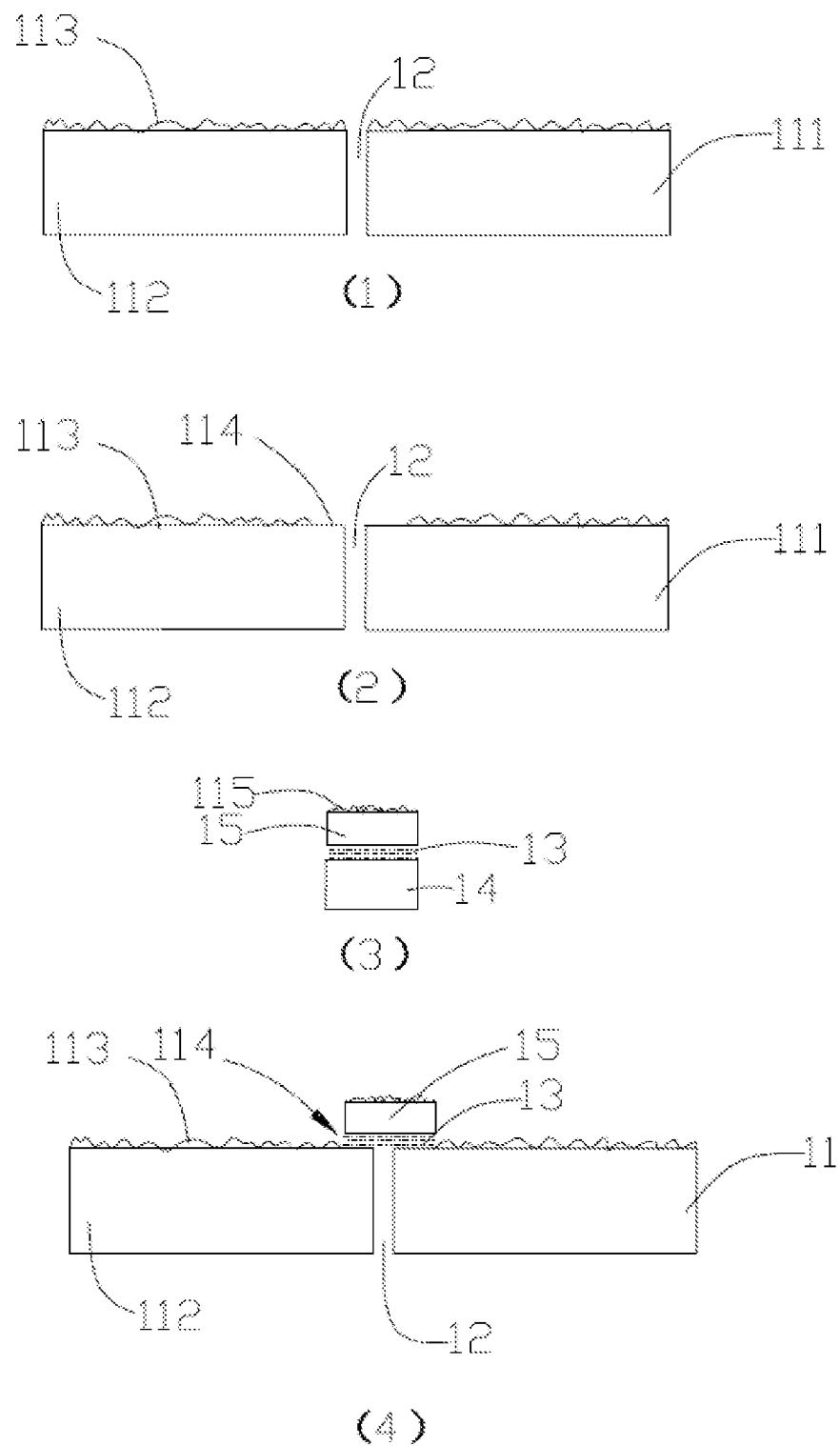
FIG. 3 is a schematic diagram of a forming process of a screen splicing structure of the present disclosure.

Referring to FIG. 3, the formation of the above-mentioned splicing structure 10 specifically includes the following steps:

(1) selecting one side edge of the first substrate 111 and one side edge of the second substrate 112, and forming the splicing seam 12 by arranging the two side edges to be close to each other;

(2) removing the optical functional material layer 113 on the front surface 11a of the two substrates within a width range of at least 5 mm from the respective selected side edge to form the optical functional material default zone 114;

(3) providing a composite tape 16, the composite tape 16 including the second optical functional material layer 115, the surface layer 15, the intermediate adhesive layer 13, and a release layer 14 that are stacked; and (4) removing the release layer 14 in the composite tape 16, attaching the composite tape 16 to the splicing seam 12, flattening bubbles or wrinkles between the intermediate adhesive layer 13 and the substrate layer 11 using a roller after covering is completed, and curing the intermediate adhesive layer 13.

Figure 4:
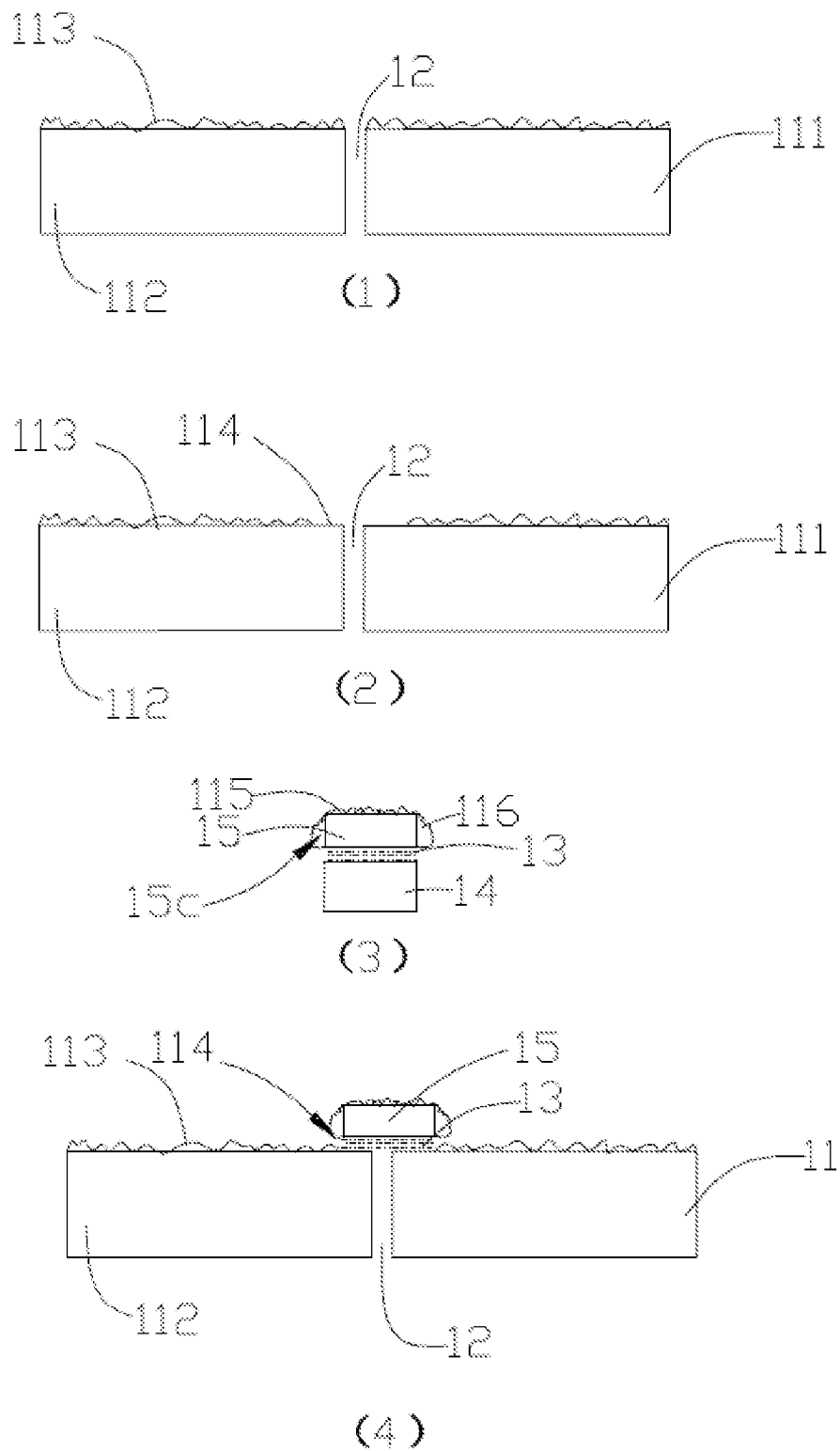
FIG. 4 is another schematic diagram of a forming process of a screen splicing structure of the present disclosure.

The optical functional material layer 113 in step (2) can be removed by using a super glue tape, or by using a solvent to wipe off. The composite tape 16 in step (3) can be produced in rolls, which reduces the period of waiting for the intermediate adhesive layer 13 to react with the surface layer 15 during splicing. Referring to FIG. 4, the composite tape 16 in step (3) can further include the third optical functional material layer 116 located on the side surface 15c of the surface layer 15. The width of the third optical functional material layer 116 decreases from the bonding surface 15a to the outer surface 15b. The third optical functional material layer 116 can be formed together with the production of the composite tape 16, for example, formed by spraying and curing by using a roll-to-roll production process.

Figure 5:
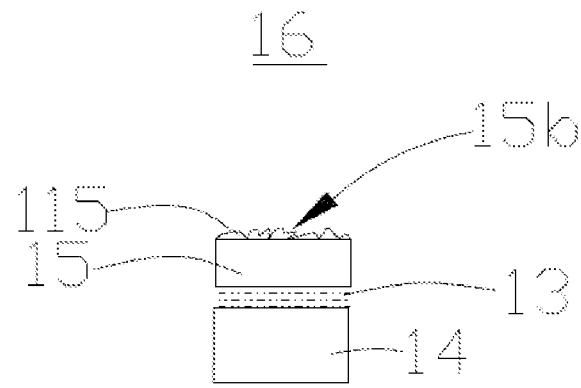
FIG. 5 is a schematic diagram of a composite tape for a screen splicing structure of the present disclosure.

Referring to FIG. 5, the second optical functional material layer 115, the intermediate adhesive layer 13, the surface layer 15 and the release layer 14 are combined to form the composite tape 16. The intermediate adhesive layer 13 is located between the surface layer 15 and the release layer 14. The second optical functional material layer 115 is located on the outer surface 15b of the surface layer 15. A specific forming method of the composite tape 16 includes the following steps:

(1) chemically treating the bonding surface 15a of the surface layer 15;

(2) coating, with a glue, the bonding surface 15a of the surface layer that has been chemically treated, to form the intermediate adhesive layer 13;

(3) bonding the release layer 14 to the intermediate adhesive layer 13; and (4) transferring an optical functional material to the outer surface 15b of the surface layer 15.

In step (1) of the specific method for forming the composite tape 16, the chemically treating the bonding surface 15a of the surface layer 15 specifically includes coating with a polyurethane coating layer so that the bonding surface 15a have a surface adhesion of 35 dy to 45 dy to increase its adhesion to the glue. In other embodiments, the bonding surface of the surface layer 15 can be subjected to corona treatment, and the present disclosure is not limited to the chemical coating treatment in the embodiment.

In step (2), the coating, with the glue, the bonding surface 15a of the surface layer that has been chemically treated to form the intermediate adhesive layer 13 is screen printing. In other embodiments, it can be any one of mold coating, blade coating, or dispensing.

Figure 6:
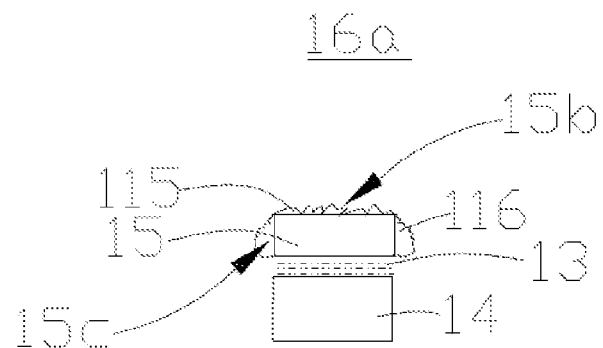
FIG. 6 is another schematic diagram of a composite tape for a screen splicing structure of the present disclosure.

In step (4), a molding process is used to form the second optical functional material layer 115 on the outer surface 15b of the surface layer 15. Referring to FIG. 6, the optical functional material can be transferred onto the side surfaces 15c in the composite tape 16 to form the third optical functional material layer 116. In other embodiments, a soft layer process can be used to respectively form the second optical functional material layer 115 and the third optical functional material layer 116 on the outer surface 15b and the side surfaces 15c of the surface layer 15. Both of the processes can avoid the problem of inability to demold due to a too small thickness of the surface layer 15. The second optical function material layer 115 and the third optical function material layer 116 should be the same as the first optical function material layer 113 located on the substrate layer to eliminate image parallax.

In some application scenarios with strong ambient light, in the above-mentioned splicing structure 10a, the first optical function material layer 113, the second optical function material layer 115, and the third optical function material layer 116 are zigzag structures that directionally reflect projection light. The optical functional material selects resin for easy molding, the intermediate adhesive layer 13 is made of a pressure-sensitive adhesive, the surface layer 15 is made of polyglycol terephthalate, and the substrate layer 11 is made of polyglycol terephthalate. In other embodiments, the surface layer 15 can be made of any one of polyvinyl chloride, polypropylene, and polyethylene, and the substrate layer 11 can also be made of any one of polyvinyl chloride, polypropylene, and polyethylene, and is not limited to polyethylene terephthalate. When the surface layer 15 and the substrate layer 11 are made of the same material, the surface layer 15 and the substrate layer 11 have the same shrinkage rate under the influence of environment, avoiding interlayer tearing in the splicing structure 10*a* caused by a difference in shrinkage rate, and ensuring the stability of the splicing structure 10*a*.

In the splicing structure 10*a*, the thickness of the substrate layer 11 is 100 μm, the thickness of the intermediate adhesive layer 13 is 2 μm, the thickness of the surface layer 15 is 10 μm, and the thickness of the release layer 14 is 50 μm. The thickness of the release layer 14 is much greater than the thickness of the intermediate adhesive layer 13 and the thickness of the surface layer 15, which facilitates tearing the release layer 14 off from the composite tape 16, and thus enables quick bonding with the substrate layer 11.

With the screen splicing structure 10*a*, the change of the normal of the surface of the splicing structure can be effectively reduced. When the front splicing of the surface layer 15 is adopted, the outer surface 15*b* of the surface layer 15 has a structure with an optical effect to ensure that colors at other positions is consistency with the color of the display screen, greatly improving the visual effect of the screen. The forming process of the screen splicing structure 10*a* are simple in steps, and the shrinkage matching between the glue layers ensures the stability of the screen splicing structure 10*a*.

Figure 7:
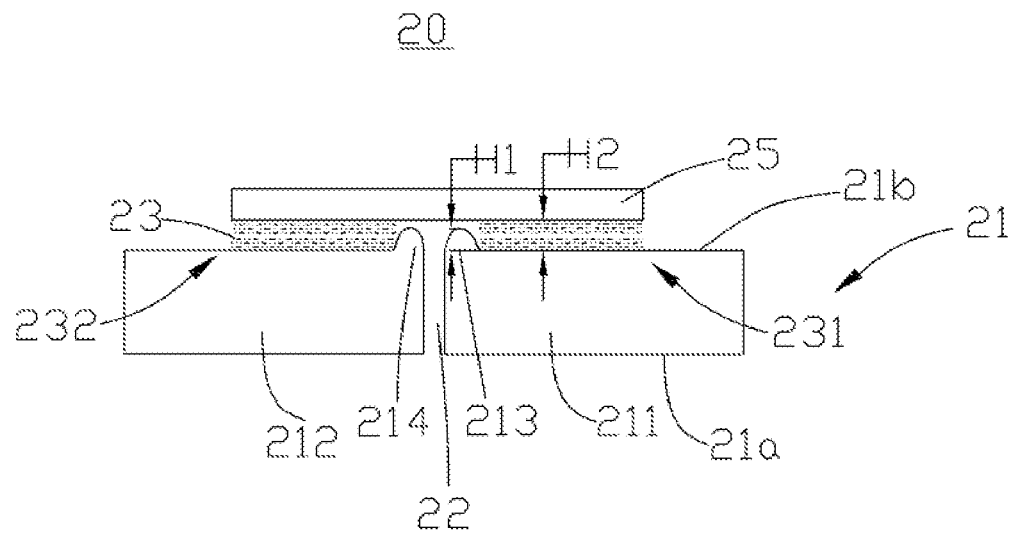
FIG. 7 is another schematic diagram of a screen splicing structure provided by an embodiment of the present disclosure.

In some embodiments, the back splicing of the surface layer 15 can also be used. Referring to FIG. 7, the present disclosure provides a screen splicing structure 20, and the screen splicing structure 20 includes a substrate layer 21, an intermediate adhesive layer 23, and a surface layer 25. The substrate layer 21 includes a first substrate 211 and a second substrate 212. A splicing seam 22 is formed between the second substrate 212 and the first substrate 211. The surface layer 25 is bonded to the substrate layer 21 through the intermediate adhesive layer 23, and the surface layer 25 covers the splicing seam 22.

The substrate layer 21 includes a front surface 21*a* and a back surface 21*b* that face away from each other, the front surface 21*a* includes an optical functional material layer (not shown), and the back surface 21*b* can be used as a back surface of the screen.

Specifically, the first substrate 211 forms a first protrusion 213 at an end of the first substrate that is located at the splicing seam 22, and the second substrate 212 forms a second protrusion 214 at an end of the second substrate that is located at the splicing seam 22. The first protrusion 213 and the second protrusion 214 protrude from the back surface 21*b*. In an embodiment, the intermediate adhesive layer 23 is divided into two sections, namely a first intermediate adhesive layer 231 and a second intermediate adhesive layer 232. The first intermediate adhesive layer 231 is adjacent to the first protrusion 213 and is bonded to the back surface 21*b* of the first substrate 211. The second intermediate adhesive layer 232 is adjacent to the second protrusion 214 and is bonded to the back surface 21*b* of the second substrate 212. That the intermediate adhesive layer 23 is divided into two sections, i.e., the first intermediate adhesive layer 231 and the second intermediate adhesive layer 232, which can prevent the glue from permeating from the splicing seam to the front surface of the substrate layer 21 and affecting the picture. A height of the first protrusion 213 and a height of the second protrusion 214 are H1, and a thickness of the first intermediate adhesive layer 231 and a thicknesses of the second intermediate adhesive layer 232 are H2, where H2>H1. The surface layer 25 evades irregular deformation of the substrate layer 21 to form the first protrusion 213 and the second protrusion 214, which ensures the flatness of the surface layer 25, thereby greatly reducing the change of the normal at the front surface 21*a* corresponding to the splicing structure 20 compared with the normal of the flat area that is not spliced.

Since the glue generates heat during the curing process, this embodiment can avoid the problem that the first protrusion 213 and the second protrusion 214 cause the glue to accumulate and generate heat in irregular areas to deform the substrate layer 21 when the intermediate adhesive layer 23 is used as a whole layer covering the splicing seam 22. Through the intermediate adhesive layer 23, the surface layer 25 smoothly covers the splicing seam 22 and effectively bonds the substrate layer 21 to the surface layer 25, achieving the purpose of screen splicing and meeting the needs of large-screen movie viewing.

The method for forming the above-mentioned screen splicing structure 20 can include the following steps:
(1) selecting one side edge of the first substrate 211 and one side edge of the second substrate 212, and forming the splicing seam 22 by arranging the two side edges to be close to each other;
(2) uniformly coating the back surface 21*b* of the first substrate 211 and the back surface 21*b* of the second substrate 212 with the glue to form the intermediate adhesive layer 23; and
(3) covering the intermediate adhesive layer 23 with the surface layer 25, flattening bubbles or wrinkles between the surface layer 25 and the intermediate adhesive layer 23 using a roller after the covering is completed, and curing the intermediate adhesive layer 23.

In other embodiments, the method for forming the splicing structure 20 can also include the following steps:
(1) selecting one side edge of the first substrate 211 and one side edge of the second substrate 212, and forming the splicing seam 22 by arranging the two side edges to be close to each other;
(2) uniformly coating the surface layer 25 with the glue to form the intermediate adhesive layer 23; and
(3) covering the substrate layer 21 with the surface layer 25, flattening bubbles or wrinkles between the intermediate adhesive layer 23 and the substrate layer 21 using a roller after the covering is completed, and curing the intermediate adhesive layer 23.

In the two forming methods, in step (2), the method for coating the surface layer 25 with the glue form the intermediate adhesive layer 23 can be blade coating, and in other embodiments, can be any one of screen, molded coating, and dispensing.

After the covering in step (3) is completed, flattening the bubbles between the surface layer 25 and the intermediate layer 23 and between the intermediate layer 23 and the substrate layer 21 using the roller can effectively avoid interspaces, wrinkles, deformation and any factor that affects the screen surface in a visually distinguishable way, which achieves the optimum viewing effect.

In the above-mentioned splicing structure 20, the intermediate adhesive layer 23 can be made of a pressure-sensitive adhesive. The substrate layer 21 can be made of polypropylene, and the surface layer 25 can be made of polypropylene. The thickness of the intermediate adhesive layer 23 is 5 μm, the thickness of the substrate layer 21 is 120 μm, and the thickness of the surface layer 25 is 8μm.

In other embodiments, the substrate layer 21 and the surface layer 25 can also be made of any one of polyethylene terephthalate, polyvinyl chloride, and polyethylene, and the intermediate adhesive layer 23 can also be made of a light-curable adhesive or pressure-sensitive adhesive. The thickness of the substrate layer 21 can be any value within a range from 100 μm to 250 μm, the thickness of the intermediate adhesive layer 23 can be any value within a range from 2 μm to 3 μm, and the thickness of the surface layer 25 can be any value within a range from 5 μm to 10 μm.

Figure 8:
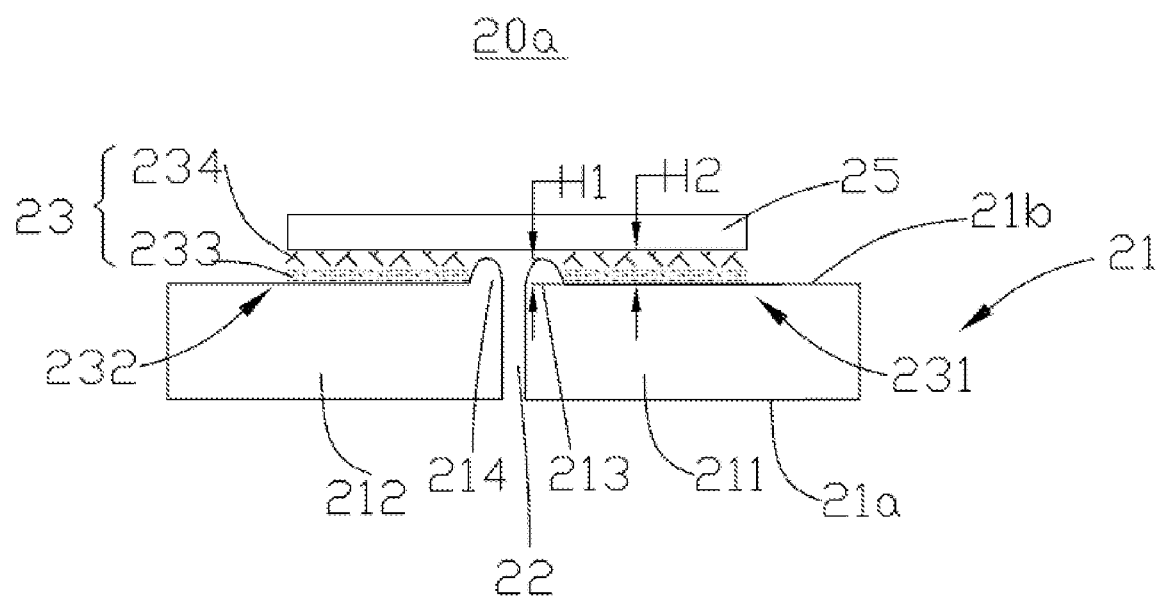
FIG. 8 is another schematic diagram of a screen splicing structure provided by an embodiment of the present disclosure.

Referring to FIG. 8, in some embodiments, each of the first intermediate adhesive layer 231 and the second intermediate adhesive layer 232 is a double-layer structure, and the double-layer structure includes a first gluing layer 233 and a second gluing layer 234. The first gluing layer 233 is located between the substrate layer 21 and the second gluing layer 234. In other embodiments, the first intermediate adhesive layer 231 and the second intermediate adhesive layer 232 can also have a structure of multiple gluing layers, such as three, four, five layers.

The method for forming the above-mentioned screen splicing structure 20a can include the following steps:
(1) selecting one side edge of the first substrate 211 and one side edge of the second substrate 212, and forming the splicing seam by arranging the two side edges to be close to each other;
(2) uniformly coating the back surface 21b of the first substrate 211 and the back surface 21b of the second substrate 212 with glue to form the first gluing layer 233, and curing the first gluing layer 233;
(3) uniformly coating the first gluing layer 233 with the glue to form the second gluing layer 234; and
(4) covering the second glue layer 234 with the surface layer 25, flattening bubbles or wrinkles between the surface layer 25 and the second gluing layer 234 using a roller after the covering is completed, and curing the second gluing layer 234.

In step (4), the flattening bubbles or wrinkles between the surface layer 25 and the second gluing layer 234 using the roller after the covering is completed can effectively avoid interspaces, wrinkles, deformation, and any factor that affects the screen surface in a visually distinguishable way to achieve the optimum viewing effect.

In other embodiments, the method for forming the splicing structure 20a can also include the following steps:
(1) selecting one side edge of the first substrate 211 and one side edge of the second substrate 212, and forming the splicing seam 22 by arranging the two side edges to be close to each other;
(2) evenly coating the surface layer 25 with the glue to form the second gluing layer 234, and curing the second gluing layer 234;
(3) uniformly coating the second gluing layer 234 with the glue to form the first gluing layer 233; and
(4) covering the substrate layer 21 with the surface layer 25, flattening air bubbles or wrinkles between the substrate layer 21 and the first gluing layer 233 using a roller after the covering is completed, and curing the first gluing layer 233.

The method for forming the screen splicing structure 20a is simple, and ensures the flatness of the surface layer 25 and the surface layer, the bonding force between surface layer and the intermediate adhesive layer 23, and the bonding force between the intermediate adhesive layer 23 and the surface layer 25 by setting the coating sequence of different gluing layers and flattening the air bubbles or wrinkles between the substrate layer 21 and the first gluing layer 233.

In an embodiment, in the above-mentioned splicing structure 20a, the first gluing layer 233 can be made of a thermosetting adhesive, the second gluing layer 234 may be made of a light-curable adhesive, the substrate layer 21 can be made of polyvinyl chloride, and the surface layer 25 can be made of polyvinyl chloride, and has been subjected to corona modification treatment to increase the wettability with the second gluing layer 234. In other embodiments, the surface layer 25 can also be added with a chemical coating to improve the wettability with the second gluing layer 234. As mentioned above, the substrate layer 21 and the surface layer 25 can be made of any one of polyethylene terephthalate, polypropylene, polyethylene, and polyvinyl chloride. Polyvinyl chloride is only an embodiment for making the substrate layer and the surface layer in the splicing structure 20a. In other embodiments, the first gluing layer 233 can be made of a light-curable adhesive or pressure-sensitive adhesive, and the second gluing layer 234 can be made of a pressure-sensitive adhesive or a thermosetting adhesive. It should be noted that when the substrate layer 21 and the surface layer 25 are made of the same material, tearing between different layers in the splicing structure 20a caused by the difference in shrinkage rate will be avoided, which ensures the stability of the splicing structure 20a.

To sum up, during screen splicing, the thickness of the intermediate adhesive layer 23 can be set to be greater than the thickness of the first protrusion 213 and the thicknesses of the second protrusion 214 so that the surface layer 25 evades the irregular deformation of the substrate layer 21 to ensure the flatness of the surface layer 25 and the stability of the splicing structure, thereby reducing the change of the normal of the surface of the splicing structure 20a and improving the image display quality.

It should be understood that, in the case where the protrusions on the edges of the substrate layer 21 face towards the viewing side of the screen, in order to avoid the protrusions, the viewing surface of the surface layer of the splicing structure has a larger thickness relative to the viewing surface of the substrate layer 21, forming a more obvious step boundary, and thus a more obvious dividing line of the movie picture at the step boundary. At this time, it is optional to use the aforementioned method of eliminating the screen dividing line, i.e., setting the same optical function layer on the side surfaces of the surface layer 25 as that on the viewing surface of the screen, the optical function layer covers the step boundary, and the width of the optical function layer decreases in a thickness direction from the substrate layer 14 to the surface layer 15, so as to form an inclined plane between the surface layer 15 and the substrate layer 14 to eliminate the picture division caused by the step boundary.

Figure 9:
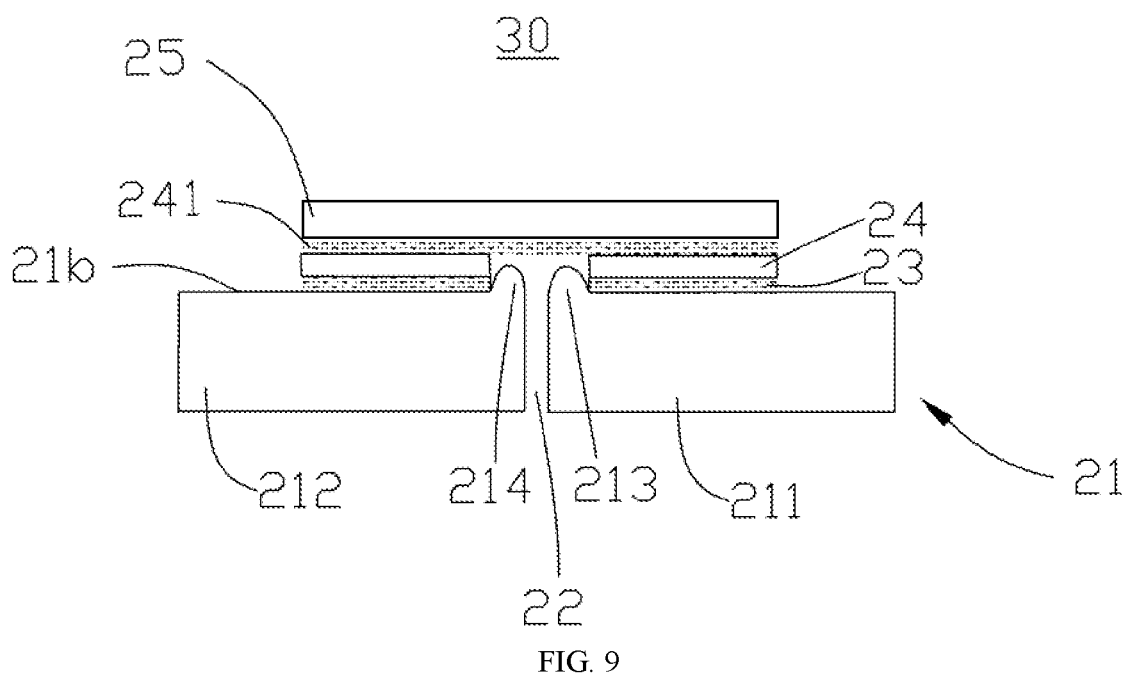
FIG. 9 is another schematic diagram of a screen splicing structure provided by an embodiment of the present disclosure.

Referring to FIG. 9, some embodiments also provide a screen splicing structure 30. In terms of structures, the screen splicing structure 30 further includes a connecting layer 24, and the connecting layer 24 is located between the substrate layer 21 and the surface layer 25 and is respectively bonded to the surface layer 25 and the substrate layer 21 through a connecting adhesive layer 241 and the intermediate adhesive layer 23. The connecting layer 24 can further improve the stability of the screen splicing structure. When the screen is stretched, the connecting layer 24 bears both a force from both the substrate layer 21 and a force from the surface layer 25 that act in opposite directions, achieving a buffering effect in a certain extent. In an embodiment, the connecting layer 24 is used for back splicing, and a sum of the thickness of the connecting layer 24 and the thickness of the intermediate adhesive layer 23 is greater than the height H1 of the first protrusion 213 and the second protrusion 214 at the cut edge of the substrate layer 21, so that the surface layer 25 evades the first protrusion 213 and the second protrusion 214 of the substrate layer 21, ensuring the flatness of the surface layer 25, thereby improving the stability of the splicing structure 30, and reducing or avoiding the change of the normal at the splicing seam 22 of the splicing structure.

In terms of materials, the substrate layer 21, the connecting layer 24 and the surface layer 25 of the screen splicing structure 30 can be made of polypropylene, and the intermediate adhesive layer 23 and the connecting adhesive layer 241 are made of a thermosetting adhesives and has a viscosity of 1 wcps to 10 wcps and a curing shrinkage rate smaller than or equal to 1.5%. The low viscosity and low curing shrinkage rate make the intermediate adhesive layer 23 and the connecting adhesive layer 241 have extremely low capillary effect, which ensures that the thermosetting adhesive will not permeate from the splicing seam 22 to the front surface 21a of the substrate layer, and avoids affecting the appearance. In other embodiments, the intermediate adhesive layer 23 and the connecting adhesive layer 241 can also be made of one of a light-curable adhesive and a pressure-sensitive adhesive.

In this embodiment, the thickness of the connecting layer 24 is 60 μm, and the thickness of the surface layer 25 is 250 μm, which provide sufficient rigidity while ensuring the same shrinkage rate. The thickness of the intermediate adhesive layer 23 and the thickness of the connecting adhesive layer 241 is 10 μm. Due to the difference in material properties, the rigidity of the connecting layer 24 is significantly better than the rigidity of the intermediate adhesive layer 23. The provided connecting layer 24 can increase the rigidity of the splicing structure 30 so that the projection screen has better imaging effect.

The method for forming the screen splicing structure 30 includes the following steps:

(1) selecting one side edge of the first substrate 211 and one side edge of the second substrate 212 respectively, and forming the splicing seam 22 by arranging the two side edges to be close to each other to;

(2) providing the connecting layer, and evenly coating the connecting layer 24 with the glue to form the intermediate adhesive layer 23;

(3) covering the back surface 21b of the substrate layer 21 with the intermediate adhesive layer 23 located on the connecting layer 24, and flattening air bubbles or wrinkles between the intermediate adhesive layer 23 and the substrate layer 21 using a roller after the covering is completed;

(4) curing the intermediate adhesive layer 23, and evenly coating the surface layer 25 with the glue to form the connecting adhesive layer 241; and (5) covering the connecting layer 24 with the surface layer 25 on, flattening air bubbles or wrinkles between the connecting adhesive layer 241 and the connecting layer 24 using a roller after the covering is completed, and curing the connecting layer 241.

The method for coating the intermediate adhesive layer 23 and the connecting adhesive layer 241 can be molded coating, and in other embodiments, be any one of screen, blade coating, and dispensing. Under the premise of ensuring the shrinkage of the glue, in other embodiments, step (4) can be repeated to increase the thickness of the connecting adhesive layer 241 to ensure the rigidity of the screen splicing structure 30, so that the projection screen is less like to bend at the splicing seam 22, and the imaging effect is better.

The method for forming the splicing structure 30 provided by this embodiment is simple in process, and ensures the flatness of the surface layer 25, the bonding force between the surface layer 25 and the connecting adhesive layer 241, and the bonding force between the connecting layer 24 and the intermediate adhesive layer 23 by setting the coating sequence of different glue layers and flattening the air bubbles/wrinkles between different splicing layers, thereby minimizing the local change of the normal at the splicing seam.

The above embodiments are only used to illustrate the technical solutions of the present disclosure, but not to provide limitations thereto. Although the present disclosure has been described in detail with reference to the foregoing embodiments, those skilled in the art should understand that they can make modifications to the recorded technical solutions of the forgoing embodiments, or make equivalent replacement to some of the technical features, while these modifications and replacements do not cause the essence of the corresponding technical solutions to deviate from the spirit and scope of the technical solutions of the embodiments of the present disclosure, and should be included in the protection scope of in the present disclosure.

The invention claimed is:

1. A screen splicing structure, comprising:
a substrate layer comprising a first substrate and a second substrate, wherein the second substrate and the first substrate are spliced and form a splicing seam at a splicing joint, wherein the substrate layer comprises a front surface for receiving projection images and a back surface facing away from the front surface, the front surface is provided with a first optical functional material layer and an optical functional material default zone, the optical functional material default zone is arranged along the splicing seam;
an intermediate adhesive layer arranged in the optical functional material default zone; and
a surface layer comprising a bonding surface and an outer surface that face away from each other, and a side surface connecting the bonding surface with the outer surface, wherein the surface layer is stacked with the intermediate adhesive layer via the bonding surface and is bonded to the substrate layer through the intermediate adhesive layer, the surface layer covers the splicing seam, and a peeling strength between the surface layer and the substrate layer is greater than or equal to 1000 gf/inch, the outer surface is provided with a second optical functional material layer, and the second optical functional material layer has a same optical effect as the first optical functional material layer.

2. The screen splicing structure according to claim 1, wherein the side surface of the surface layer is provided with a third optical functional material layer, and a width of the third optical functional material layer decreases in a direction from the bonding surface to the outer surface, so as to form an inclined plane connecting the first optical functional material layer on the substrate layer with the second optical functional material layer on the surface layer.

3. The screen splicing structure according to claim 2, wherein the first optical functional material layer, the second optical functional material layer, and the third optical functional material layer are made of a same material and are of zigzag structures that directionally reflect projection light.

4. The screen splicing structure according to claim 1, wherein each of a material of the substrate layer and a material of the surface layer is one of polyethylene terephthalate, polyvinyl chloride, polypropylene, and polyethylene, and a material of the intermediate adhesive layer is one of a light-curable adhesive, a thermosetting adhesive and a pressure-sensitive adhesive and has a viscosity of 1 wcps to 10 wcps and a curing shrinkage rate smaller than or equal to 1.5%.

5. The screen splicing structure according to claim 1, wherein the substrate layer has a thickness ranging from 100 µm to 250 µm, the intermediate adhesive layer has a thickness ranging from 5 µm to 20 µm, and the surface layer has a thickness ranging from 100 µm to 250 µm.

6. A method for forming the screen splicing structure according to claim 1, comprising following steps:
(1) selecting one side edge of the first substrate and one side edge of the second substrate, and forming the splicing seam by arranging the side edge of the first substrate and the side edge of the second substrate to be close to each other;
(2) removing an optical functional material layer within a preset width range from the side edge of the first substrate and the side edge of the second substrate to form the optical functional material default zone;
(3) providing a composite tape, the composite tape comprising the second optical functional material layer, the surface layer, the intermediate adhesive layer, and a release layer that are stacked; and
(4) removing the release layer, attaching remaining parts of the composite tape to the splicing seam, flattening air bubbles or wrinkles between the intermediate adhesive layer and the substrate layer using a roller after covering is completed, and curing the intermediate adhesive layer.

7. The method for forming the screen splicing structure according to claim 6, wherein manufacturing the composite tape comprises following steps:
(1) chemically treating the bonding surface of the surface layer;
(2) coating the chemically-treated bonding surface with a glue to form the intermediate adhesive layer, the glue being one of a light-curable adhesive, a thermosetting adhesive and a pressure-sensitive adhesive;
(3) bonding the release layer and the intermediate adhesive layer; and
(4) transferring an optical functional material to the outer surface of the surface layer.

8. The screen splicing structure according to claim 1, wherein the substrate layer and surface layer are made of a same material.

9. A screen splicing structure comprising:
a substrate layer comprising a first substrate and a second substrate, wherein the second substrate and the first substrate are spliced and form a splicing seam at a splicing joint;
an intermediate adhesive layer; and
a surface layer, wherein the surface layer is stacked with the intermediate adhesive layer and is bonded to the substrate layer through the intermediate adhesive layer, the surface layer covers the splicing seam, and a peeling strength between the surface layer and the substrate layer is greater than or equal to 1000 gf/inch; and
wherein the substrate layer comprises a front surface for receiving projection images and a back surface facing away from the front surface, the first substrate comprises a first protrusion at an end of the first substrate that is located at the splicing seam, the second substrate comprises a second protrusion at an end of the second substrate that is located at the splicing seam, the first protrusion and the second protrusion protrude from the back surface, the intermediate adhesive layer comprises a first intermediate adhesive layer and a second intermediate adhesive layer, the first intermediate adhesive layer is adjacent to the first protrusion and bonded to the back surface of the first substrate, the second intermediate adhesive layer is adjacent to the second protrusion and bonded to the back surface of the second substrate.

10. The screen splicing structure according to claim 9, wherein a connecting layer and a connecting adhesive layer are further provided between the surface layer and the intermediate adhesive layer, the connecting layer is located between the intermediate adhesive layer and the connecting adhesive layer, and the connecting adhesive layer is located between the connecting layer and the surface layer.

11. The screen splicing structure according to claim 10, wherein a material of the connecting layer is one of polyethylene terephthalate, polyvinyl chloride, polypropylene, and polyethylene, and a material of the connecting adhesive layer is one of a light-curable adhesive, a thermosetting adhesive and a pressure-sensitive adhesive, and has a viscosity of 1 wcps to 10 wcps and a curing shrinkage rate smaller than or equal to 1.5%.

12. A method for forming the screen splicing structure according to claim 10, comprising following steps:
(1) selecting one side edge of the first substrate and one side edge of the second substrate, and forming the splicing seam by arranging the side edge of the first substrate and the side edge of the second substrate to be close to each other;
(2) providing the connecting layer and uniformly coating the connecting layer with a glue to form the intermediate adhesive layer, the glue being one of a light-curable adhesive, a thermosetting adhesive and a pressure-sensitive adhesive;
(3) covering the back surface of the substrate layer with the intermediate adhesive layer located on the connecting layer, and flattening air bubbles or wrinkles between the intermediate adhesive layer and the substrate layer using a roller after the covering is completed;
(4) curing the intermediate adhesive layer and uniformly coating the surface layer with a glue to form the connecting adhesive layer, the glue being one of a light-curable adhesive, a thermosetting adhesive and a pressure-sensitive adhesive; and
(5) covering the connecting layer with the surface layer, flattening air bubbles or wrinkles between the connecting adhesive layer and the connecting layer after the covering is completed, and curing the connecting adhesive layer.

13. A method for forming the screen splicing structure according to claim 9, comprising following steps:
(1) selecting one side edge of the first substrate and one side edge of the second substrate, and forming the splicing seam by arranging the side edge of the first substrate and the side edge of the second substrate to be close to each other;
(2) uniformly coating the back surface or the surface layer with a glue to form the intermediate adhesive layer, the glue being one of a light-curable adhesive, a thermosetting adhesive and a pressure-sensitive adhesive; and (3) covering the intermediate adhesive layer with the surface layer, flattening air bubbles or wrinkles between the surface layer and the intermediate adhesive layer using a roller after the covering is completed, and curing the intermediate adhesive layer.

14. The screen splicing structure according to claim 9, wherein the first protrusion and the second protrusion have a height of H1, and the first intermediate adhesive layer and the second intermediate adhesive layer have a thickness of H2, where H2>H1.

15. The screen splicing structure according to claim 9, wherein a connecting layer is made of a same material as the substrate layer or the surface layer.

16. A composite tape for splicing a screen, wherein the screen comprises a first substrate and a second substrate bonded with each other, a splicing seam is formed at a splicing position of the first substrate and the second substrate, the composite tape is configured to cover the splicing seam and comprises a second optical functional material layer, a surface layer and an intermediate adhesive layer stacked with each other, and wherein the surface layer comprises a bonding surface and an outer surface that face away from each other, and wherein the surface layer is stacked with the intermediate adhesive layer via the bonding surface and covers the splicing seam via the intermediate adhesive layer, and the second optical functional material layer is formed on the outer surface of the surface layer.

17. The composite tape according to claim 16, wherein the surface layer further comprises a side surface connecting the bonding surface with the outer surface, and wherein the side surface is provided with a third optical functional material layer, and a width of the third optical functional material layer decreases in a direction from the bonding surface to the outer surface.

* * * * *